United States Patent
Judd et al.

(10) Patent No.: US 10,184,399 B2
(45) Date of Patent: Jan. 22, 2019

(54) INLET PARTICLE SEPARATOR SYSTEMS AND METHODS

(71) Applicant: HONEYWELL INTERNATIONAL INC., Morris Plains, NJ (US)

(72) Inventors: Zedic Daniel Judd, Phoenix, AZ (US); Yogendra Yogi Sheoran, Scottsdale, AZ (US); Jennifer Ann Reich, Chandler, AZ (US); Todd A. Kincheloe, Mesa, AZ (US); Yates Wong, Humboldt, AZ (US); Cristopher Frost, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 366 days.

(21) Appl. No.: 15/092,820

(22) Filed: Apr. 7, 2016

(65) Prior Publication Data

US 2016/0312698 A1   Oct. 27, 2016

Related U.S. Application Data (63) Continuation-in-part of application No. 13/621,764, filed on Sep. 17, 2012, now Pat. No. 9,314,723.

(51) Int. Cl.
*B01D 45/12* (2006.01)
*F02C 7/052* (2006.01)
(Continued)

(52) U.S. Cl.
CPC ............. *F02C 7/052* (2013.01); *B01D 45/04* (2013.01); *B01D 45/08* (2013.01); *B01D 45/12* (2013.01);
(Continued)

(58) Field of Classification Search
CPC . F02C 7/052; F02C 7/055; F02C 7/05; B01D 45/12; B01D 45/08; B01D 45/04;
(Continued)

(56) References Cited

U.S. PATENT DOCUMENTS

| 3,993,463 A | 11/1976 | Barr |
| 4,509,962 A | 4/1985 | Breitman et al. |

(Continued)

FOREIGN PATENT DOCUMENTS

EP    0211513 A1    2/1987

OTHER PUBLICATIONS

EP examination report for application No. 13 175 570.4 dated Dec. 16, 2013.
(Continued)

*Primary Examiner* — Dung H Bui
(74) *Attorney, Agent, or Firm* — Lorenz & Kopf, LLP (57) ABSTRACT

An inertial inlet particle separator system for a vehicle engine is provided. A separator assembly and collector assembly are coupled to the scavenge flow path and configured to receive the scavenge air. The collector inlet has a throat defining a cumulative throat area at each position along the throat length from the first throat end to the second throat end. The collector body defines a cross-sectional area associated with each position along the throat length between the first throat end and the second throat end. The collector outlet is coupled to the collector body such that scavenge air flows into the collector inlet, through the collector body, and out through the collector outlet. At a first position between the first throat end and the second throat end, the respective cross-sectional area of the collector body is greater than or equal to the respective cumulative throat area.

6 Claims, 9 Drawing Sheets

(51) Int. Cl.
 *B01D 45/04* (2006.01)
 *B01D 45/16* (2006.01)
 *B01D 45/08* (2006.01)
 *F02C 7/055* (2006.01)
 *F02C 7/05* (2006.01)
 *B01D 50/00* (2006.01)

(52) U.S. Cl.
 CPC ............. *B01D 45/16* (2013.01); *F02C 7/055* (2013.01); *B01D 50/002* (2013.01); *F02C 7/05* (2013.01); *F05D 2260/607* (2013.01); *Y10T 137/0536* (2015.04)

(58) Field of Classification Search
 CPC . B01D 45/16; B01D 50/002; F05D 2260/607; Y10T 137/0536
 See application file for complete search history.

(56) References Cited

U.S. PATENT DOCUMENTS

| | | |
|---|---|---|
| 4,527,387 A | 7/1985 | Lastrina et al. |
| 4,685,942 A | 8/1987 | Klassen et al. |
| 4,928,480 A * | 5/1990 | Oliver .................... B64D 33/02 55/306 |
| 5,039,317 A | 8/1991 | Thompson et al. |
| 5,139,545 A | 8/1992 | Mann |
| 5,279,109 A | 1/1994 | Liu et al. |
| 6,499,285 B1 | 12/2002 | Snyder |
| 6,702,873 B2 | 3/2004 | Hartman |
| 7,678,165 B2 | 3/2010 | Tingle et al. |
| 7,802,433 B2 | 9/2010 | Higgins |
| 7,927,408 B2 | 4/2011 | Sheoran et al. |
| 7,967,554 B2 | 6/2011 | Bremer |
| 9,314,723 B2 * | 4/2016 | Judd ...................... B01D 45/04 |
| 2003/0024232 A1 | 2/2003 | Snyder et al. |
| 2009/0139398 A1 | 6/2009 | Sheoran et al. |
| 2014/0076159 A1* | 3/2014 | Judd ...................... B01D 45/04 95/271 |

OTHER PUBLICATIONS

EP search report for application No. 13 175 570.4 dated Dec. 3, 2013.

\* cited by examiner

INLET PARTICLE SEPARATOR SYSTEMS AND METHODS

CROSS-REFERENCE TO RELATED APPLICATION

This application is a continuation in part of application Ser. No. 13/621,764, filed Sep. 17, 2012. This application claims priority to application Ser. No. 13/621,764, which is also hereby incorporated by reference.

STATEMENT REGARDING FEDERALLY SPONSORED RESEARCH OR DEVELOPMENT

This invention was made with Government support under W911 W6-08-2-0001 awarded by the U.S. Army. The Government has certain rights in this invention

TECHNICAL FIELD

The present invention generally relates to fluid inlets for vehicle engines, and more particularly relates to methods and systems for separating particles flowing into vehicle engines, such as aircraft engines.

BACKGROUND

During operation, fluids such as air are pulled from the atmosphere into an engine and used to generate energy to propel the vehicle. The fluids may contain undesirable particles, such as sand and dust, which may cause issues for engine components. In order to prevent such issues, at least a portion of the undesirable particles are removed from the fluids using an inertial inlet particle separator.

A conventional inertial inlet particle separator typically includes a duct system with a fluid inlet that transitions into 1) a scavenge channel that forms an in-line fluid path with the fluid inlet and 2) a clean channel that branches off from the in-line fluid path. As the name suggests, inertia tends to cause the particles to travel in a straight line rather than follow the curved fluid flow path. This being the case, particles and a portion of the air carrying the particles tend to flow straight into the scavenge channel rather than curve into the clean intake channel. As such, the clean air is separated from the contaminated air and guided into the engine. The contaminated air is guided from the scavenge channel into a blower or other type of suction source and discharged. Approximately 15-25% of the fluid entering the fluid inlet typically enters the scavenge channel, while the remaining fluid and lighter particles enter the clean channel. As designed, the fluid entering the scavenge channel includes most of the larger particles such that only a small percentage of particles enter the engine through the clean channel, thereby protecting engine components.

Although some conventional inertial inlet particle separators are successful in providing relatively clean fluid to the engine, they may also have the adverse impact of increasing the pressure loss of the air entering the engine, with the attendant decrease in engine power output and increase in fuel consumption.

Accordingly, it is desirable to provide improved methods and systems for separating particles from inlet fluid for a vehicle engine. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an inertial inlet particle separator system for a vehicle engine is provided. The system includes a separator assembly defining a fluid inlet for receiving inlet air, and a scavenge flow path and an engine flow path configured to separate the inlet air into scavenge air and engine air such that the scavenge air is directed into the scavenge flow path and the engine air is directed into the engine flow path. The system further includes a collector assembly coupled to the scavenge flow path and configured to receive the scavenge air. The collector assembly includes a collector inlet coupled to the scavenge flow path. The collector inlet has a throat extending from a first throat end to a second throat end to define a throat length. The throat defines a cumulative throat area at each position along the throat length from the first throat end to the second throat end. The collector assembly further includes a collector body coupled to the collector inlet along the throat length. The collector body defines a cross-sectional area associated with each position along the throat length between the first throat end and the second throat end. The collector assembly further includes a collector outlet coupled to the collector body such that scavenge air flows into the collector inlet, through the collector body, and out through the collector outlet. At a first position between the first throat end and the second throat end, the respective cross-sectional area of the collector body is greater than or equal to the respective cumulative throat area.

In accordance with an exemplary embodiment, an inertial inlet particle separator system for a vehicle engine includes a separator assembly defining a fluid inlet for receiving inlet air. The separator assembly further includes a scavenge flow path and an engine flow path and configured to separate the inlet air into scavenge air and engine air such that the scavenge air is directed into the scavenge flow path and the engine air is directed into the engine flow path. The system further includes a collector assembly coupled to the scavenge flow path of the separator assembly. The collector assembly is bifurcated to form a first collector assembly portion configured to receive a first portion of the scavenge air and a second collector assembly portion configured to receive a second portion of the scavenge air.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Embodiments described herein provide inertial inlet particle separator systems and methods for separating particles from an inlet fluid and providing the clean fluid to an engine. Particularly, the systems and methods bifurcate the collector flow paths to reduce the distance that the scavenge flow must travel to the outlet. The system and methods additionally have a geometric configuration in which a collector body cross-sectional area is greater than a cumulative collector inlet throat area. As a result, such systems and methods may reduce pressure loss and increase separation and operation efficiency.

Figure 1:
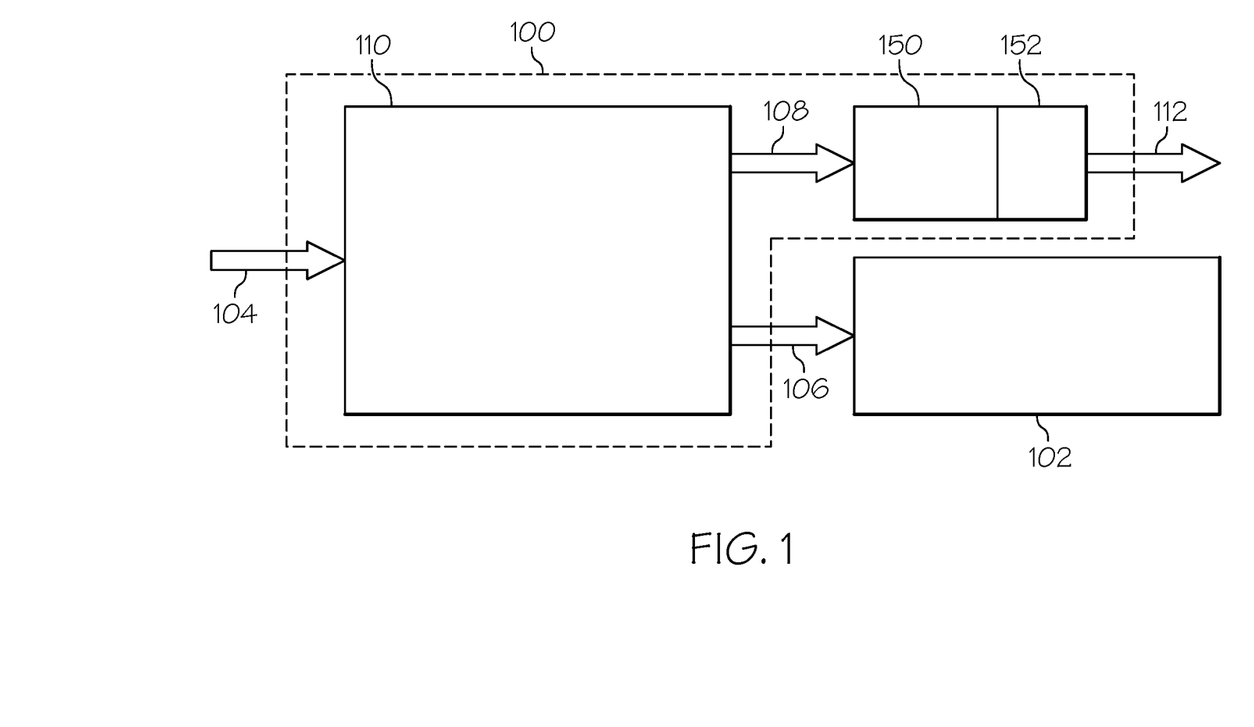
FIG. 1 is a block diagram of an inlet particle separator system for supplying clean air to an engine in accordance with an exemplary embodiment.

FIG. 1 is an exemplary block diagram of an inertial inlet particle separator system 100 coupled to an engine 102. The engine 102 may be, for example, a turbine engine of an aeronautical vehicle such as a helicopter. The engine 102 receives air from the separator system 100, compresses the air to elevate the air pressure, adds fuel, ignites the mixture, and uses the combustion gases to drive a series of turbines, the work from which may be used to propel the vehicle or generate electricity.

Particularly, and as discussed in further detail below, the separator system 100 receives inlet air 104 and provides relatively clean air 106 for use by the engine 102. The separator system 100 includes an inertial inlet particle separator assembly 110 that receives the inlet air 104. The separator assembly 110 separates the inlet air 104 into the engine air 106 provided to the engine 102 and the scavenge air 108. The scavenge air 108 is drawn into a collector assembly 150 by a fan 152 and then exhausted into the atmosphere as exhaust air 112. In one embodiment, the fan 152 may be electric and function to induce the scavenge air 108 into the separator system 100. Although not shown, the separator system 100 may include sensors, controllers, adjustment mechanisms and/or other components.

Since the scavenge air 108 must be separated and exhausted, drawing scavenge air 108 in addition to engine air 106 through the inlet results in some pressure loss to the engine 102. If unaddressed, excess pressure loss may contribute to degraded performance of the engine 102 and/or require increased operation of the fan 152 with the associated energy cost. As described in greater detail below, the collector assembly 150 may be configured to enable a more efficient operation of the separator system 100, and thus, a more efficient operation of the engine 102.

Figure 2:
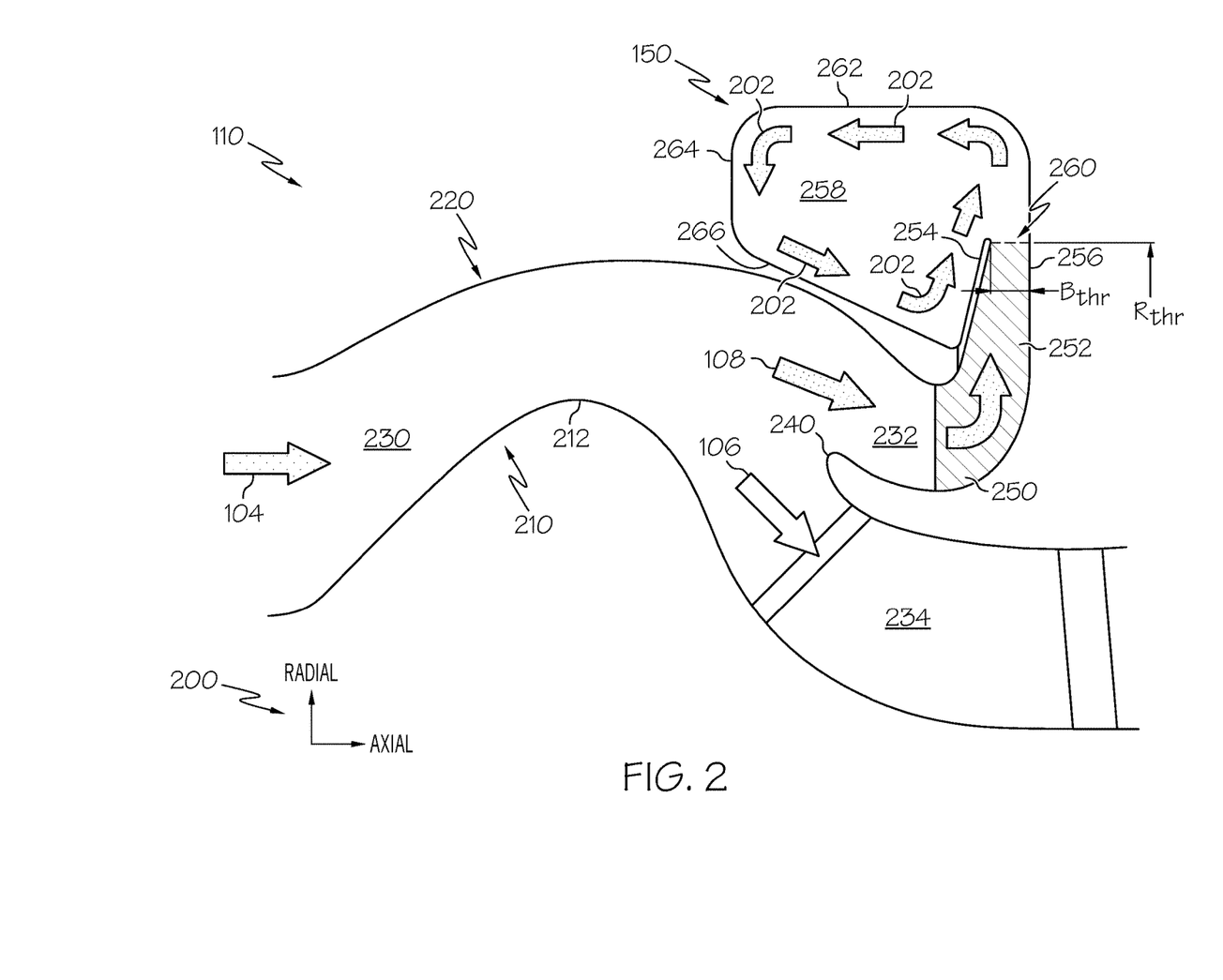
FIG. 2 is a partial, more detailed cross-sectional view of the separator system of FIG. 1 in accordance with an exemplary embodiment.

FIG. 2 is a partial, more detailed cross-sectional view of the separator system 100 of FIG. 1 in accordance with an exemplary embodiment. In particular, FIG. 2 illustrates a portion of the separator assembly 110 and the collector assembly 150. As described above, inlet air 104 enters the separator assembly 110 and is separated into scavenge air 108 and engine air 106. Scavenge air 108 with debris and dirt particles flows into the collector assembly 150, while relatively clean engine air 106 flows from the separator assembly 110 into the engine 102 (FIG. 1), as described in more detail below. As used herein, the term "axial" generally refers to an orientation or direction parallel to the engine centerline and the term "radial" generally refers to an orientation or direction perpendicular to the engine centerline. The axial and radial directions are indicated by legend 200 in FIG. 2.

The separator assembly 110 is defined by a hub 210 and a shroud 220. The shroud 220 typically circumscribes the hub 210 to define an annular flow path 230 for the inlet air 104 in an upstream portion of the separator assembly 110. A splitter 240 is positioned to divide the flow path 230 into a scavenge flow path (or channel) 232 and an engine (or clean) flow path (or channel) 234. As such, the scavenge flow path 232 is defined by the splitter 240 and the shroud 220, and the engine flow path 234 is defined by the splitter 240 and the hub 210. As described in greater detail below, the scavenge flow path 232 is fluidly coupled to the collector assembly 150, and the engine flow path 234 is fluidly coupled to the engine 102.

The hub 210 and shroud 220 are configured to separate the inlet air 104, which may include dirt and other debris, into the relatively clean engine air 106 and scavenge air 108, which carries the debris into the collector assembly 150. Particularly, the hub 210 includes a radial element 212 that forces the inlet air 104 from a generally axial orientation into a partially outward radial direction. As the inlet air 104 flows radially outward, the debris that forms the scavenge air 108 tends to engage the shroud 220 and maintain a flow along the shroud 220 into the scavenge flow path 232 as a result of inertia. However, the relatively clean engine air 106 may flow radially inward and radially around the radial element 212, closer to the hub 210, and into the engine flow path 234. As such, the engine air 106 is separated from the scavenge air 108.

As shown in FIG. 2, the scavenge flow path 232 is coupled to an inlet 250 of the collector assembly 150. The collector assembly 150 generally includes a radial passage 252 extending from the inlet 250 and defined by a vortex fence 254 and a downstream wall 256. The collector assembly 150 further includes a collector body 258 extending from the radial passage 252. In particular, the collector body 258 is coupled to the radial passage 252 at a throat 260, which may be defined at the termination of the vortex fence 254. The radial passage 252 and the throat 260 may be considered as part of the inlet 250 or the collector body 258. The collector body 258 may be at least partially defined by a portion of the downstream wall 256, an outer circumferential wall 262, an upstream wall 264, an inner circumferential wall 266, and the vortex fence 254. The vortex fence 254 generally prevents flow circulating through the collector body 258 from blocking flow from the throat 260 from entering the collector body 258, thereby reducing pressure losses in the collector assembly 150. As an example, vortex flow 202 is depicted in FIG. 2 flowing through the collector body 258. Although the vortex flow 202 is generally depicted as a vortex in FIG. 2, as described above, the flow 202 is also flowing circumferentially around the collector assembly 150. In any event, the configuration of the inner circumferential wall 266 and the vortex fence 254 function to maintain the vortex shape of the flow 202 as the flow 202 flows close to the throat 260. In other words, the flow 202 is directed along the inner circumferential wall 266 in a generally radial and axial direction, and as the flow 202 meets the vortex fence 254, the flow 202 is directed generally radially outward. As a result of this arrangement, the flow 202 is directed past the throat 254 instead of flowing towards the downstream wall 256 and avoid and/or mitigates interference of the flow 202 with the flow through throat 260, e.g., by directing flow 202 to a location adjacent to the throat 260 and/or in the same radially outward direction as the flow through the throat 260. As described below, the collector body 258 may be a scroll or partial scroll to collect and discharge the scavenge air 108.

Figure 3:
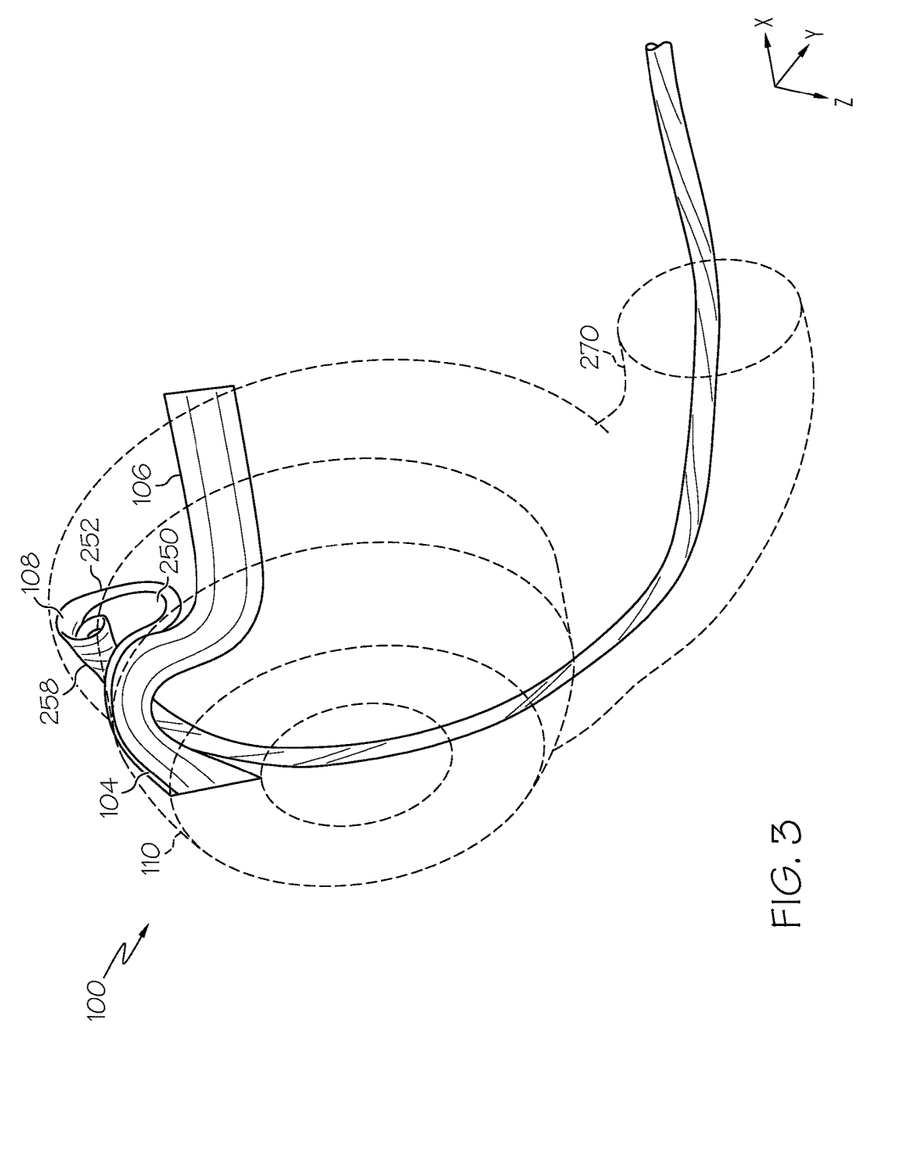
FIG. 3 is a partial isometric view of the separator system of FIG. 1 in accordance with an exemplary embodiment.

FIG. 3 is a partially transparent, isometric view of the separator system 100 of FIGS. 1 and 2. A portion of the air flowing through the separator system 100 is depicted in the view of FIG. 3. As shown in FIG. 3 and introduced above, inlet air 104 flows into the separator assembly 110 in which the inlet air 104 is separated into relatively clean engine air 106 and relatively dirty scavenge air 108. The clean engine air 106 flows out of the separator assembly 110 into the engine (not shown). The scavenge air 108 flows into the collector assembly 150. For example, the scavenge air 108 flows into the inlet 250, through the radial passage 252, and into the collector body 258.

FIG. 3 particularly shows the annular nature of the separator assembly 110. As described above, in one exemplary embodiment, the collector body 258 at least partially wraps around separator assembly 110. The collector body 258 is coupled to an outlet 270, which is oriented in a generally axial direction such that the scavenge air 108 flowing through the collector body 258 is exhausted out of the collector assembly 150 through the outlet 270.

Although FIG. 3 shows a slice of inlet air 104 in a radial-axial plane, the separator assembly 110 generally has an annular inlet such that the inlet air 104 flows into the separator assembly 110. As the inlet air 104 is separated, the scavenge air 108 continues to flow into the collector body 258. In other words, the collector body 258 continues to receive additional scavenge air 108 along the circumferential length of the collector body 258, as discussed in greater detail below.

Figure 4:
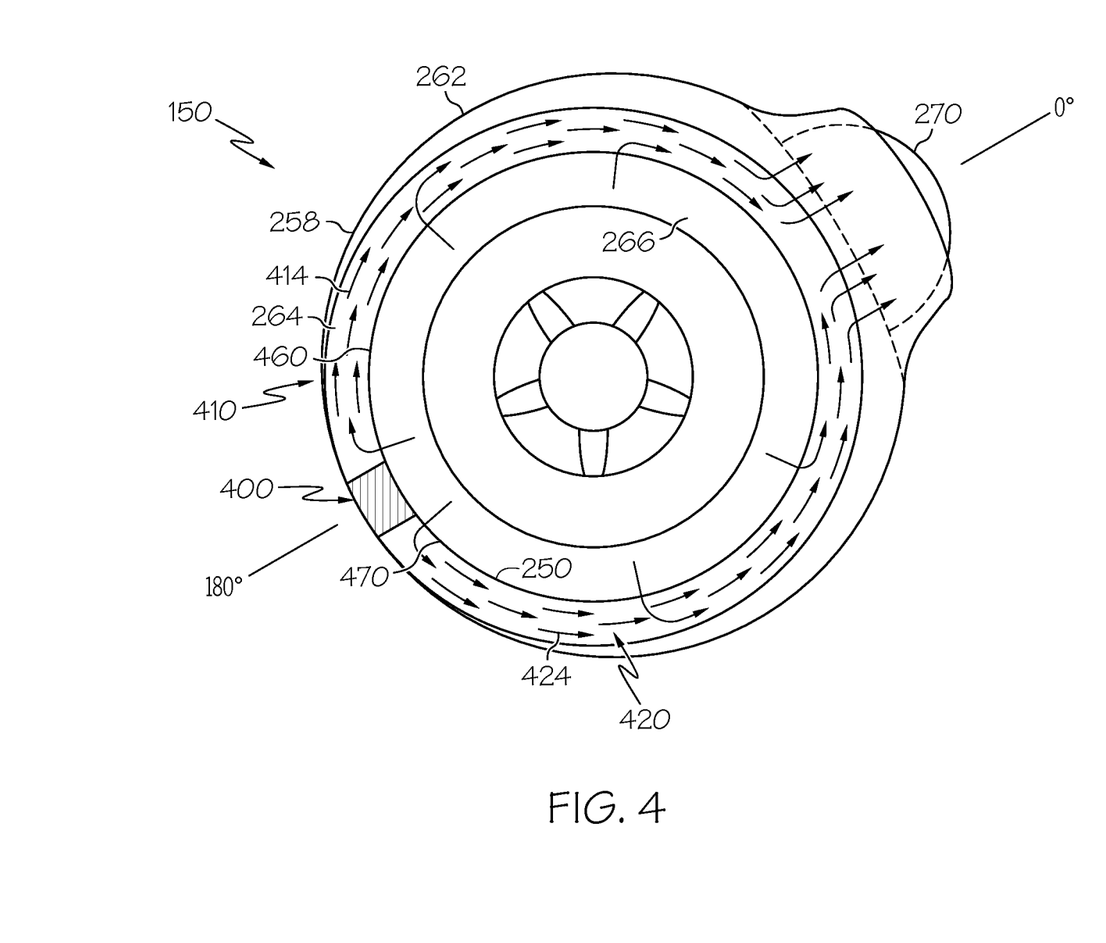
FIG. 4 is a front view of a collector of the separator system of FIG. 1 in accordance with an exemplary embodiment.

Additional details about the collector assembly 150 are provided below with reference to FIGS. 4 and 5. FIG. 4 is a front (or upstream) side view of the collector assembly 150 according to an exemplary embodiment. FIG. 4 particularly illustrates the outer circumferential wall 262, the upstream wall 264, and the inner circumferential wall 266. FIG. 4 additionally shows the inlet 250 and outlet 270 of the collector assembly 150. As noted above and additionally referring to FIGS. 2 and 3, the scavenge air 108 flows into the inlet 250, through the radial passage 252, through the collector body 258, and out of the outlet 270.

In one exemplary embodiment, the collector assembly 150 may be bifurcated. In other words, as shown in FIG. 4, the collector assembly 150 may include a partition 400. In one exemplary embodiment, the partition 400 may be a wall positioned within the collector body 258 and generally extending in an axial-radial plane to circumferentially divide the collector body 258 into a first collector body portion 410 and a second collector body portion 420. The throat 260 defining the entry of the body portions 410, 420 may be similarly considered respective first and second throat portions 460, 470 (e.g., the body portions 410, 420 and throat portions 460, 470 respectively form collector assembly portions). Each of the throat portions 460, 470 may be considered to have a first throat portion end at the partition 400 and a second throat portion end at the outlet 270 to define respective throat portion lengths. In some embodiments, the partition 400 may additionally extend through the radial passage 252 and/or inlet 250 to circumferentially divide the entire collector assembly 150. In any event, as shown in FIG. 4, the partition 400 is typically arranged at a circumferential position approximately 180° from the outlet 270 such that the first and second collector body portions 410, 420 have approximately the same circumferential lengths, e.g., using the outlet 270 as a reference point (labeled 0° in FIG. 4), each of the collector body portions 410, 420 has a length of approximately 180°.

During operation, if scavenge air 108 enters the collector assembly 150 on a circumferential first side of the partition 400, the scavenge air 108 flows through the first collector body portion 410 in a first circumferential direction, as indicated by arrows 414. If scavenge air 108 enters the collector assembly 150 on a circumferential second side of the partition 400, the scavenge air 108 flows through the second collector body portion 420 in a second circumferential direction, as indicated by arrows 424. In the view of FIG. 4, the first circumferential direction of air flowing through the first collector body portion 410 is clockwise, and the second circumferential direction of air flowing through the second collector body portion 420 is counter-clockwise. The first and second body portions 410, 420 are each coupled to the outlet 270 such that the air flowing through each body portion 410, 420 flows out through the common outlet 270, although other embodiments may have separate outlets.

A conventional collector assembly may have a complete scroll collector body. As such, conventional collector assemblies require the scavenge air to travel potentially 360° from an initial circumferential scroll position to the collector outlet. The relatively long distance may result in a pressure drop along the length of the collector scroll body, thereby requiring increased power in the fan to draw scavenge air along the length and/or compromised performance with respect to the scavenge air removed from the engine air.

By comparison, the collector assembly 150 in FIG. 4 is bifurcated such that the maximum circumferential path that the scavenge air 108 must travel is only 180° (e.g., from the partition 400 along the first circumferential length of the body portion 410 to the outlet 270 or from the partition 400 along the second circumferential length of the body portion 420 to the outlet 270). Since the bifurcated circumferential flow path is only half that of conventional collector assemblies, the pressure drop through the collector body 258 is improved. As such, collector assembly 150 may provide an improvement in separation performance and/or reduction in power to the fan 152. An additional or alternative mechanism to improve performance is discussed below with reference to FIG. 5.

Figure 5:
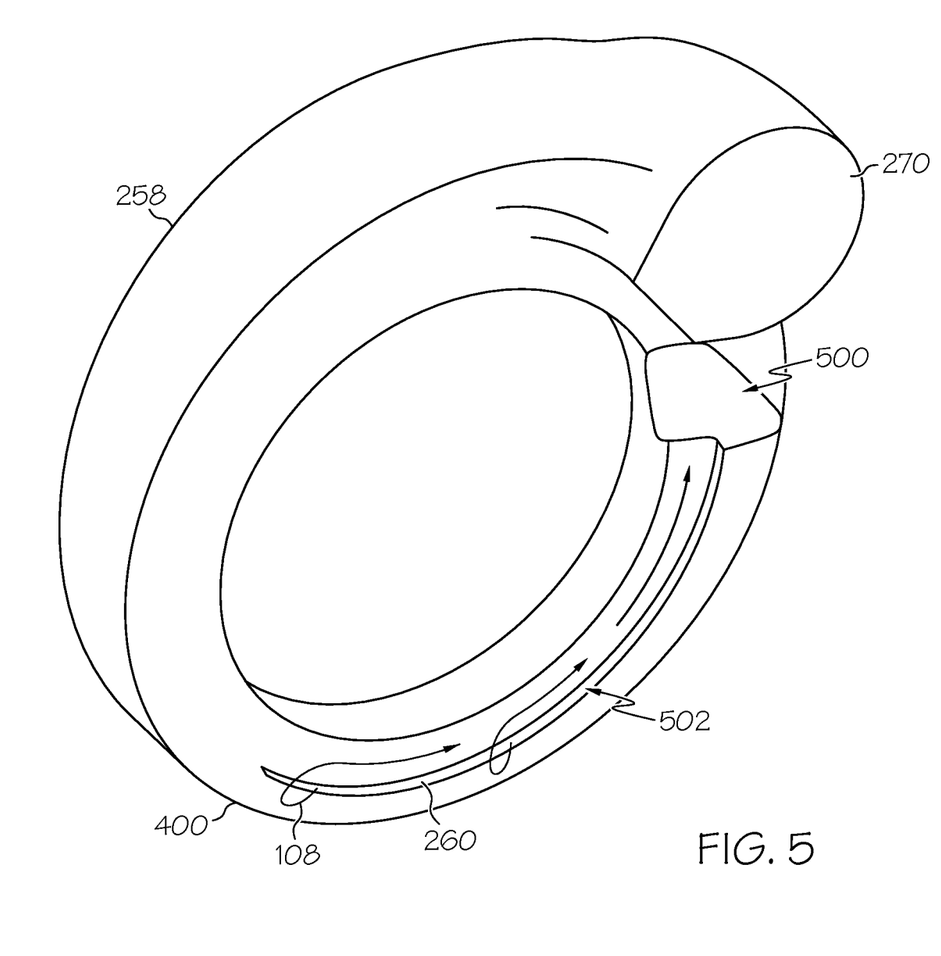
FIG. 5 is a partial isometric view of the collector of FIG. 4 in accordance with an exemplary embodiment.

FIG. 5 is a partially transparent schematic, isometric view of the collector body 258 of the collector assembly 150 of FIGS. 1-4 in accordance with an exemplary embodiment. FIGS. 1-4 are referenced below in the description of FIG. 5. As described above, the scavenge air 108 flows into the collector body 258 through the throat 260. FIG. 5 illustrates a visual representation of a throat area ($A_{thr}$) and one collector body cross-sectional area ($A_{x-sec}$). As described in greater detail below, a cumulative throat area ($A_{cum\_thr}$) and collector body cross-sectional area ($A_{x-sec}$) may be manipulated to provide improved performance. In one exemplary embodiment, the ratio of collector body cross-sectional area ($A_{x-sec}$) to cumulative throat area ($A_{cum\_thr}$) is at least one (e.g., $A_{x-sec}/A_{cum\_thr} \geq 1$). In some embodiments, the ratio of collector body cross-sectional area ($A_{x\text{-}sec}$) to cumulative throat area ($A_{cum\_thr}$) is generally constant along the length of the collector assembly. In other embodiment, the ratio of collector body cross-sectional area ($A_{x\text{-}sec}$) to cumulative throat area ($A_{cum\_thr}$) is varies along the length of the collector assembly.

Figure 6:
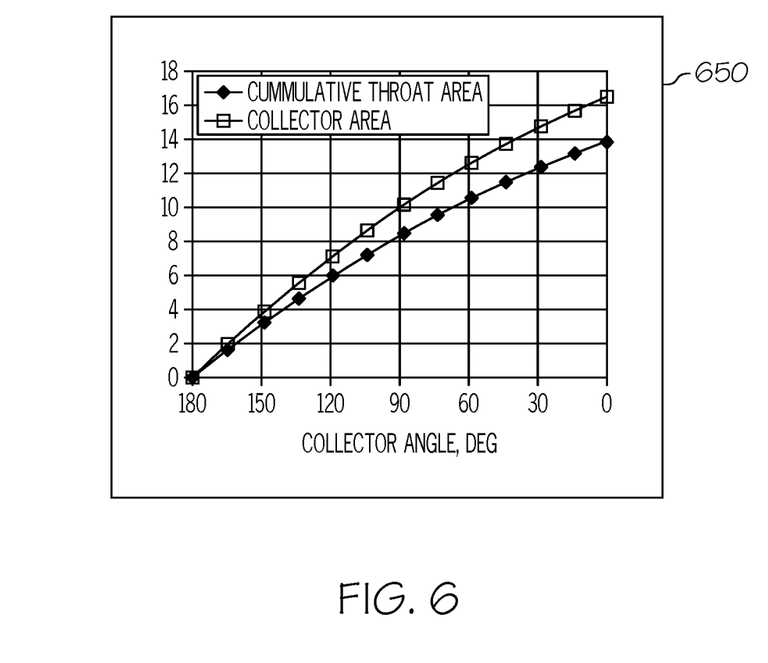
FIG. 6 is a chart illustrating collector body cross-sectional area and cumulative throat area, each as a function of circumferential collector position.

An example of the relationship between collector body cross-sectional area ($A_{x\text{-}sec}$) Sec) and cumulative throat area ($A_{cum\_thr}$) is provided with reference to FIG. 6, which is a chart illustrating exemplary calculations. Reference is additionally made to FIGS. 2 and 5. In the example provided by FIG. 6, the collector body cross-sectional area ($A_{x\text{-}sec}$) and cumulative throat area ($A_{cum\_thr}$) are considered with respect to 15° increments in which the partition 400 is considered 180° and the outlet 270 is considered 0°. In this example, the bifurcated collector body 258 is circumferentially symmetric, e.g. the first body portion 410 has generally identical characteristics to the second body portion 420, such that only half (or) 180° of the collector body 258 needs to be illustrated.

FIG. 2 illustrates one exemplary position of a throat width ($b_{thr}$) and throat radius ($R_{thr}$) to calculate the cumulative throat area ($A_{cum\_thr}$) and the collector body cross-sectional area ($A_{x\text{-}sec}$). As an example, for a 15° segment length, the throat area ($A_{thr}$) may be expressed as Equation (1), as follows:

$$A_{thr}=2*\pi*R_{thr}*15°/360°*b_{thr} \quad \text{Equation (1)}$$

The collector body cross-sectional area ($A_{x\text{-}sec}$) is a local, radial cross-section represented by the shaded area in FIG. 2 and may be calculated based on the dimensions of the downstream wall 256, outer circumferential wall 262, upstream wall 264, inner circumferential wall 266, and the vortex fence 254. In the discussion below, the collector body cross-sectional area ($A_{x\text{-}sec}$) is the cross-sectional area at the respective circumferential position. FIG. 5 additionally illustrates an exemplary collector body cross-sectional area ($A_{x\text{-}sec}$) 500 and a corresponding cumulative throat area ($A_{cum\_thr}$) 502. Although the collector body cross-sectional area ($A_{x\text{-}sec}$) generally increases along the length of the collector body 258, the area may be limited by packaging and overall size considerations for the separator system 100. As such, considering that the collector assembly 150 is designed such that the collector body cross-sectional area ($A_{x\text{-}sec}$) is greater than the cumulative throat area ($A_{cum\_thr}$), the throat width (b) must typically decrease along the throat length to maintain this relationship.

Equation (1) described above generally provides an equation for throat area ($A_{thr}$) in a radial passage, such as that shown in FIG. 2. However, in alternate embodiments, the throat and/or collector body may be axial and/or axial and radial. In general, exemplary embodiments may represent a throat cross-sectional area ($A_{thr}$) for a 15° segment as expressed in Equation (2), as follows:

$$A_{thr}=\pi*(R_{thr\_o}+*R_{thr\_i})15°/360°*b_{thr} \quad \text{Equation (2)}$$

where
$R_{thr\_o}$ is the outer radius of the throat, and
$R_{thr\_i}$ is the inner radius of the throat.

In one exemplary embodiment, the throat width ($b_{thr}$) may be linearly reduced along the length of the throat, e.g., a reduction of about 60%, although any reduction may be provided. However, in other embodiments, the throat width ($b_{thr}$) may be reduced to any width and/or in a non-linear manner. In further embodiments, the throat width ($b_{thr}$) may remain constant and/or increase.

FIG. 6 depicts an exemplary plot 650 in which the cross-sectional area ($A_{x\text{-}sec}$) of the collector body 258 and cumulative throat width ($A_{cum\_thr}$) are plotted as a function of circumferential position, which additionally illustrates that the cross-sectional area ($A_{x\text{-}sec}$) of the collector body 258 is greater than the cumulative throat width ($A_{cum\_thr}$) throughout the length of the collector body 258. It should be noted that this ratio may be maintained even if the collector body 258 is not bifurcated, e.g., for lengths greater than 180°, including 360°.

FIGS. 2-6 depict embodiments in which the circumferential flow path is bifurcated into two path portions such that the maximum circumferential path that the scavenge air must travel is 180°. However, other embodiments may be provided the divide the circumferential flow path into more than two path portions, as will be discussed in greater detail below with reference to FIGS. 7-9.

Figure 7:
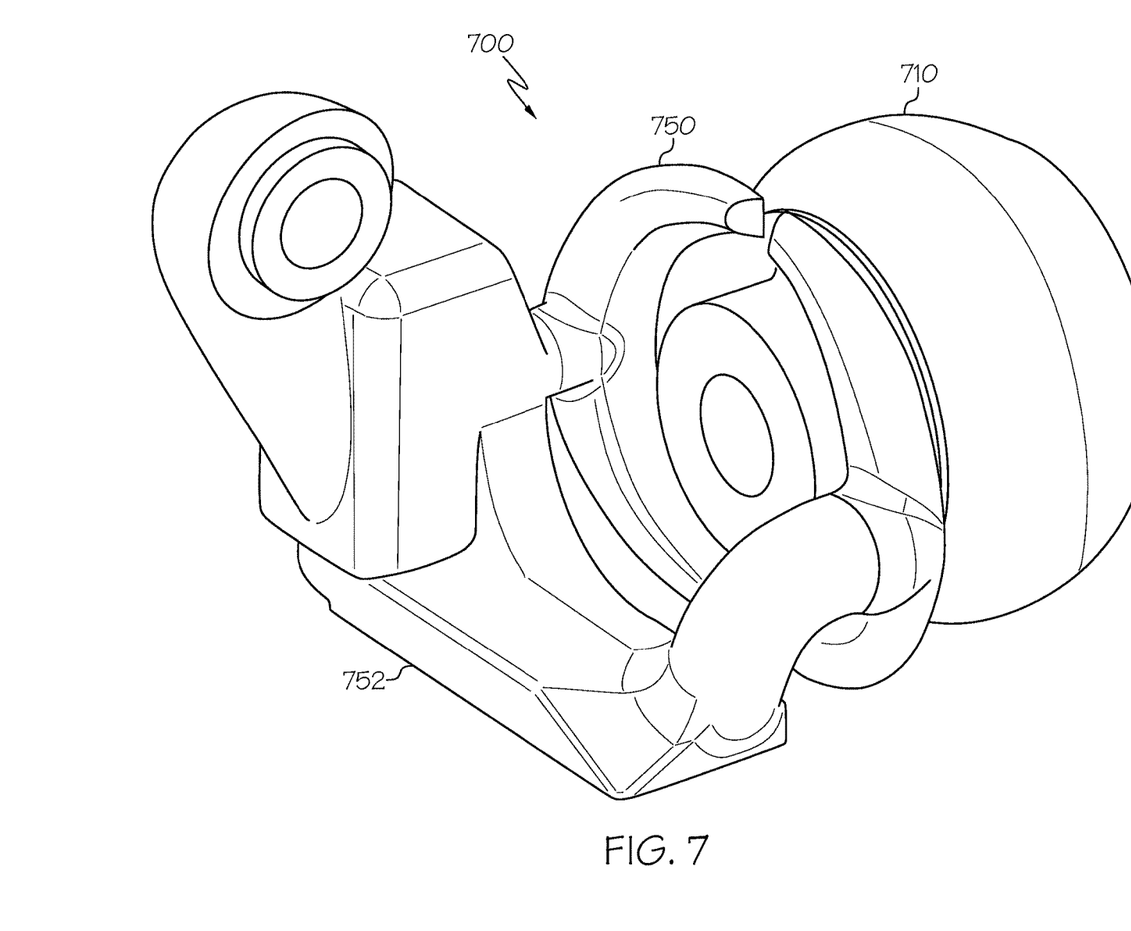
FIG. 7 is an isometric view of an inlet particle separator system of FIG. 1 in accordance with another exemplary embodiment.

FIG. 7 is an isometric view of an inlet particle separator system 700 in accordance with another exemplary embodiment. Unless otherwise noted, the system 700 of FIG. 7 may correspond to the system 100 of FIGS. 1-6. As shown in FIG. 7, the system 700 may include a separator assembly 710 and a collector assembly 750. Generally, the view in FIG. 7 is an external view of the separator assembly 710 and collector assembly 750 in an upstream direction. FIG. 7 additionally depicts the FADEC (full authority digital engine control) unit 752 that receives the scavenge air from the collector assembly 750.

Figure 8:
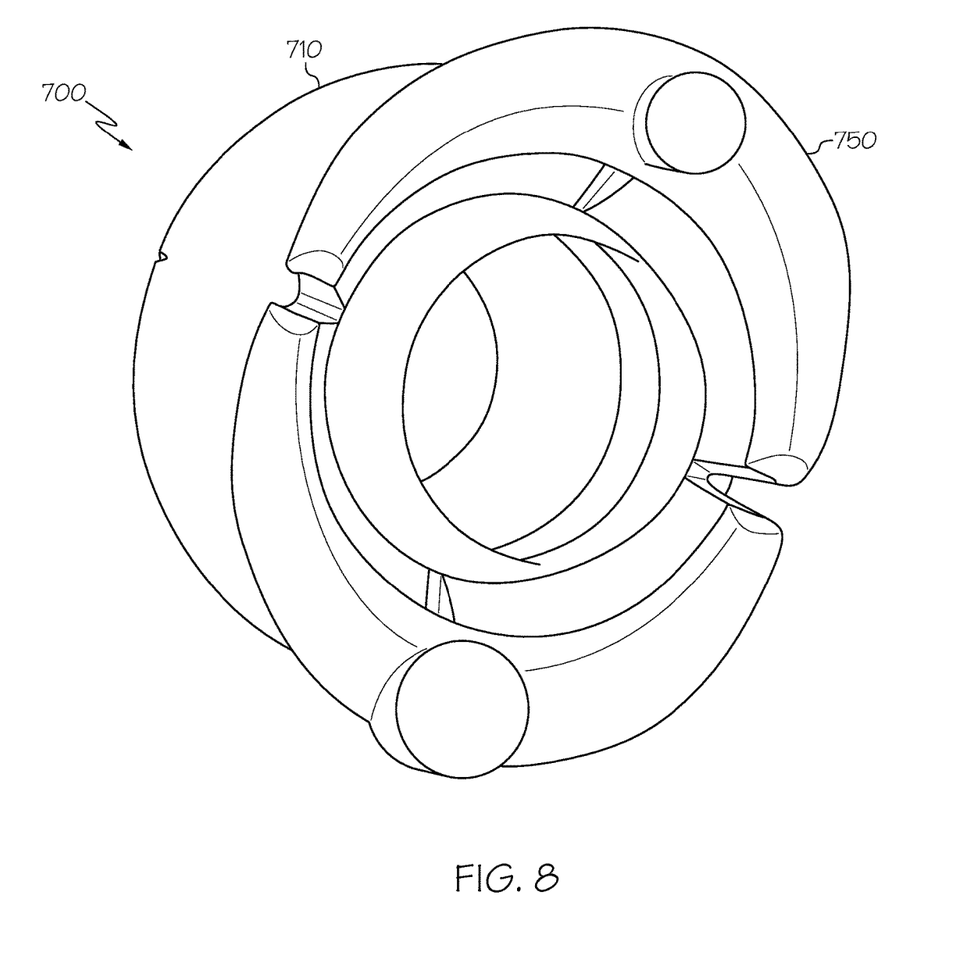
FIG. 8 is a further isometric view of the inlet particle separator system of FIG. 7 in accordance with an exemplary embodiment.
Figure 9:
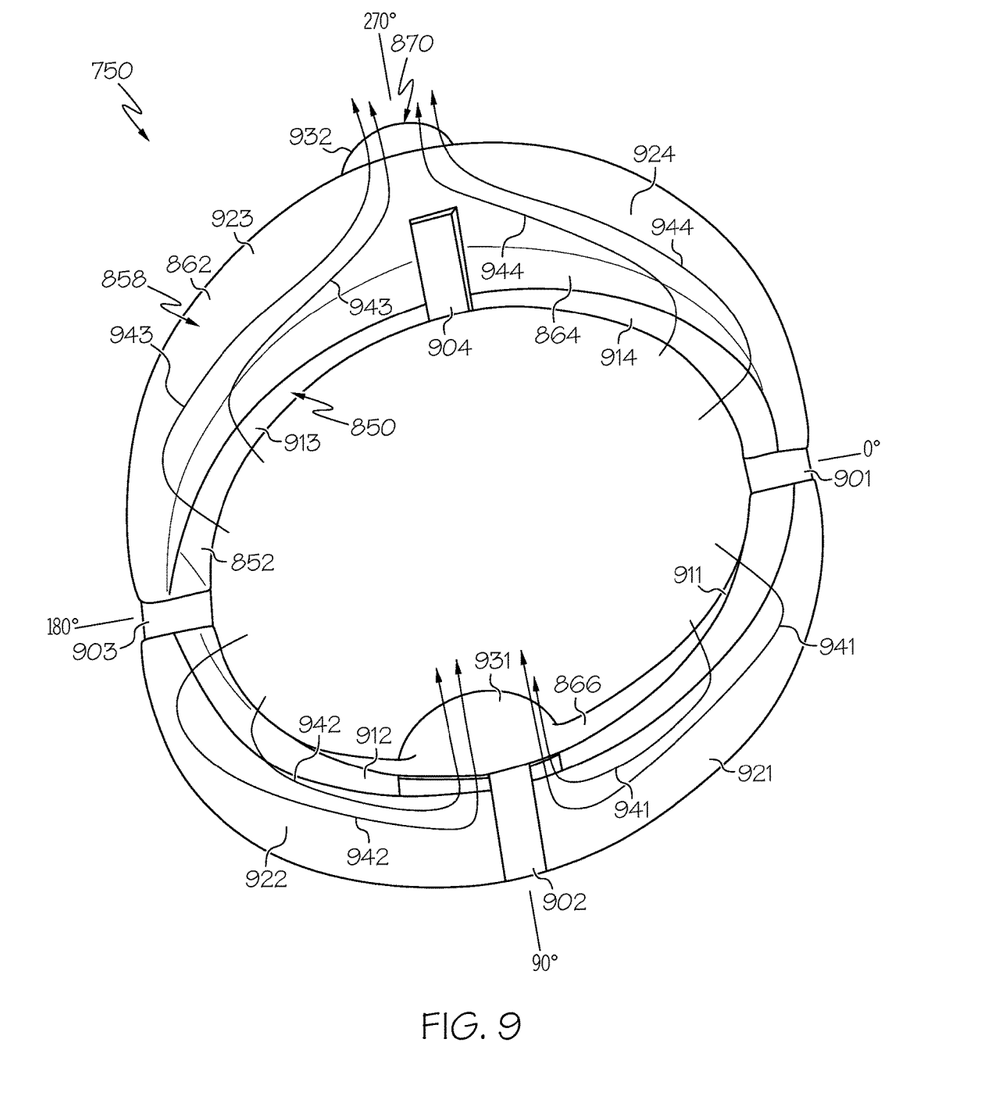
FIG. 9 is an isometric view of a collector assembly of the inlet particle separator system of FIG. 7 in accordance with an exemplary embodiment.

FIG. 8 is further isometric view of the inlet particle separator system 700 of FIG. 7 in accordance with an exemplary embodiment. Relative to FIG. 7, FIG. 8 depicts the system 700 without the FADEC unit 752. FIG. 9 is an isometric view of the collector assembly 750 removed from other portions of the system 700.

The separator system 710 depicted in FIGS. 7 and 8 generally corresponds to the separator assembly 110 depicted in FIGS. 1-3 that receives the inlet air and separates the inlet air into the engine air provided to the engine and the scavenge air drawn into the collector assembly 750. Also similar to the previous exemplary embodiments, and using FIG. 9 as a reference, the collector assembly 750 may be considered to have an outer circumferential wall 862, an upstream wall 864, and an inner circumferential wall 866. FIG. 9 additionally shows the inlet 850 and outlet 870 of the collector assembly 750. As noted above (additionally referring to FIGS. 2 and 3), the scavenge air 108 flows from the separator assembly 710 (or 110) into an inlet 250, through a radial passage 252, through the collector body 858, and out of the outlet 870. Contrary to the collector assembly 150 depicted in FIGS. 2-6, however, the collector assembly 750 of FIGS. 7-9 separates the scavenge air into more than two path portions.

In particular, and referring to FIG. 9, the collector assembly 750 may be divided into four path portions. For example, the collector assembly 750 may include four partitions 901-904 that divide aspects of the collector assembly 750 into the respective portions. Each partition 901-904 may be a wall, strut, or other separating element positioned within the collector assembly 750. As shown, partitions 901-904 function to divide the collector assembly 750 into first, second, third, and fourth inlet or throat portions 911-914. In some embodiments, the partitions 901-904 function to divide the collector assembly 750 into first, second, third, and fourth collector body portions 921-924. Generally, a "partition" refers to any element that functions to separate two portions. For example, a closed end on a structure may be considered a partition with respect to an adjacent structure. In the depicted embodiment, each of the throat portions 911-914 and/or collector body portions 921-924 extend approximately 90° along the circumference of the collector assembly 750.

The collector assembly 750 in FIGS. 7-9 may also be considered to have an outlet 870 with two outlet portions 931, 932 (or two outlets 931, 932). The first outlet portion 931 is positioned in between the first and second throat portions 911, 912 and in between the first and second body portions 921, 922 (e.g., at partition 902). The second outlet portion 932 is positioned in between the third and fourth throat portions 913, 914 and in between the third and fourth body portions 923, 924 (e.g., at partition 904). During operation, air flowing into the first and second throat portions 911, 912 respectively flow through the first and second body portions 921, 922 and out through the first outlet portion 931. Similarly, air flowing into the third and fourth throat portions 913, 914 respectively flow through the third and fourth body portions 923, 924 and out through the second outlet portion 932. Air flowing through the first, second, third, and fourth body portions 921-924 are respectively depicted schematically by arrows 941-944. As shown in FIG. 9, the maximum path traveled by the air within each portion 921-924 is 90°.

Similar to the embodiments of FIGS. 2-6, the embodiments of FIGS. 7-9 are subject to a particular relationship between collector body cross-sectional area ($A_{x\text{-}sec}$) and cumulative throat area ($A_{cum\_thr}$), Specifically, the ratio of collector body cross-sectional area ($A_{x\text{-}sec}$) to cumulative throat area ($A_{cum\_thr}$) is at least one (e.g., $A_{x\text{-}sec}/A_{cum\_thr} \geq 1$). In some embodiments, the ratio of collector body cross-sectional area ($A_{x\text{-}sec}$) to cumulative throat area ($A_{cum\_thr}$) is generally constant along the length of the collector assembly. In other embodiments, the ratio of collector body cross-sectional area ($A_{x\text{-}sec}$) to cumulative throat area ($A_{cum\_thr}$) varies along the length of the collector assembly.

In one exemplary embodiment, this relationship holds true for each of the throat portions 911-914 and collector body portions 921-924, particularly for any position between a partition 901-904 and an outlet portion 931, 932, such as any position between a first end at a respective partition 901-904 to a second end at a respective outlet portion 931, 932. For example, for any position between partition 901 and outlet 931 in the direction of air flow (e.g., from 0° to 90°), the collector body cross-sectional area ($A_{x\text{-}sec}$) of the body portion 921 will be at least as large as the cumulative throat area ($A_{cum\_thr}$) at that position. Moreover, for any position between partition 903 and outlet 931 in the direction of air flow (e.g., from 180° to 90°), the collector body cross-sectional area ($A_{x\text{-}sec}$) of the body portion 922 will be at least as large as the cumulative throat area ($A_{cum\_thr}$) at that position. This relationship is also applicable from 180° to 270° and from 0° to 270°. As described in greater detail above, this relationship between cumulative throat area ($A_{cum\_thr}$) and collector body cross-sectional area ($A_{x\text{-}sec}$) provides improved performance by improving pressure drop as air flows through the collector body.

Although exemplary embodiments are described above with respect to an inertial inlet particle separator system operating in air and therefore separating contaminated air from clean air, the present invention may be applied to inertial particle separators operating in or utilizing other fluids. For example, a fluid may be in the form of a liquid rather than air, as may be used in ships, submarines, and/or other watercraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inertial inlet particle separator system for a vehicle engine, comprising:
    a separator assembly defining a fluid inlet for receiving inlet air, the separator assembly further including a scavenge flow path and an engine flow path and configured to separate the inlet air into scavenge air and engine air such that the scavenge air is directed into the scavenge flow path and the engine air is directed into the engine flow path; and
    a collector assembly coupled to the scavenge flow path and configured to receive the scavenge air, the collector assembly comprising
        a collector inlet coupled to the scavenge flow path, the collector inlet having a throat extending from a first throat end to a second throat end to define a throat length, wherein the throat further defines a cumulative throat area at each position along the throat length from the first throat end to the second throat end,
        wherein the collector assembly includes a first partition, a second partition, a third partition, and a fourth partition that collectively divide the throat into a first throat portion extending between the first and second partitions, a second throat portion extending between the second and third partitions, a third throat portion extending between the third and fourth partitions, and a fourth throat portion extending between the fourth and first partitions;
        a collector body coupled to the collector inlet along the throat length, wherein the collector body defines a cross-sectional area associated with each position along the throat length between the first throat end and the second throat end,
        wherein the collector body includes a first body portion along the first throat portion, a second body portion along the second throat portion, a third body portion along the third throat portion, and a fourth body portion along the fourth throat portion,
        wherein the collector assembly is a circumferential collector assembly with a circumference, and wherein each of the first and second throat portions extends approximately 90° of the circumference; and
        a collector outlet coupled to the collector body such that scavenge air flows into the collector inlet, through the collector body, and out through the collector outlet,
        wherein the collector outlet includes a first outlet portion and a second outlet portion, and wherein the first and second body portions direct air into the first outlet portion and the third and fourth body portions direct air into the second outlet portions, and wherein, at a first position between the first throat end and the second throat end, the respective cross-sectional area of the collector body is greater than or equal to the respective cumulative throat area.

2. The inertial inlet particle separator system of claim 1, wherein, at all positions between the first throat end and the first position, the respective cross-sectional area of the collector body is greater than or equal to the respective cumulative throat area.

3. The inertial inlet particle separator system of claim 1, wherein, at all positions between the first throat end and the second throat end, respective ratios between respective cross-sectional areas of the collector body and respective cumulative throat areas are generally constant.

4. The inertial inlet particle separator system of claim 1, wherein, at all positions between the first throat end and the second throat end, the respective cross-sectional area of the collector body is greater than or equal to the respective cumulative throat area.

5. The inertial inlet particle separator system of claim 1, wherein the first and second outlet portions are separated from one another along the circumference by approximately 180°.

6. The inertial inlet particle separator system of claim 1, wherein the collector assembly is at least partially a scroll that surrounds the separator assembly.

* * * * *